(12) United States Patent
Akatani et al.

(10) Patent No.: US 7,507,283 B2
(45) Date of Patent: Mar. 24, 2009

(54) AQUEOUS DISPERSION, INK COMPOSITION AND INKJET RECORDING METHOD USING SAME

(75) Inventors: Yoshiki Akatani, Kita-ku (JP); Katsunori Fujii, Kita-ku (JP); Yuji Suzuki, Kita-ku (JP); Mariko Umeda, Kita-ku (JP); Tadahiko Tabe, Kita-ku (JP); Yoshiyuki Dejima, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 139 days.

(21) Appl. No.: 11/628,822

(22) PCT Filed: Jun. 7, 2005

(86) PCT No.: PCT/JP2005/010422

§ 371 (c)(1),
(2), (4) Date: Dec. 7, 2006

(87) PCT Pub. No.: WO2005/121263

PCT Pub. Date: Dec. 22, 2005

(65) Prior Publication Data

US 2008/0070009 A1    Mar. 20, 2008

(30) Foreign Application Priority Data

Jun. 9, 2004  (JP)  ............... 2004-171626

(51) Int. Cl.
   C09D 11/00    (2006.01)
   C09D 11/02    (2006.01)
   B41J 2/01     (2006.01)
   B32B 3/10     (2006.01)
   B01F 3/08     (2006.01)

(52) U.S. Cl. ............... 106/31.58; 106/31.86; 347/102; 428/195.1; 516/9

(58) Field of Classification Search ........... 106/31.34, 106/31.58, 31.66, 31.86; 347/102; 428/195.1; 516/9

See application file for complete search history.

(56) References Cited

U.S. PATENT DOCUMENTS

| | | | | |
|---|---|---|---|---|
| 5,281,262 | A * | 1/1994 | Saito | ............ 523/161 |
| 5,990,201 | A | 11/1999 | Miyazaki et al. | ............ 523/161 |
| 6,776,829 | B2 * | 8/2004 | Miyamoto et al. | ........ 106/31.58 |
| 2003/0196568 | A1 * | 10/2003 | Miyamoto et al. | ........ 106/31.58 |
| 2003/1968568 | | 10/2003 | Miyamoto et al. | |
| 2004/0196343 | A1 | 10/2004 | Maekawa et al. | ........... 347/100 |
| 2004/0250728 | A1 * | 12/2004 | Ikoma et al. | ............. 106/31.75 |
| 2006/0173094 | A1 * | 8/2006 | Ikoma et al. | ................ 523/161 |

FOREIGN PATENT DOCUMENTS

| | | |
|---|---|---|
| GB | 2 379 222 | 3/2003 |
| JP | 2-295787 | 12/1990 |
| JP | 3-259970 | 11/1991 |
| JP | 7-3178 | 1/1995 |
| JP | 10-183041 | 7/1998 |
| JP | 2003-246954 | 9/2003 |
| WO | 96/06729 | 3/1996 |
| WO | 01/92431 | 12/2001 |
| WO | 2004/011558 | 2/2004 |

OTHER PUBLICATIONS

English translation of JP 10/183041, Jul. 1998.*
International Search Report dated Sep. 13, 2005.
European Search Report dated Aug. 6, 2008.

* cited by examiner

*Primary Examiner*—Helene Klemanski
(74) *Attorney, Agent, or Firm*—Nields, Lemack & Frame, LLC

(57) ABSTRACT

The present invention relates to an aqueous dispersion of a water-insoluble coloring material having superior shelf life stability which is suitable to an ink for ink-jetting, an ink composition superior in shelf life stability and discharge property, a method for inkjet recording using said ink composition, and recorded article obtained thereby. Said aqueous dispersion is characterized by comprising a water-insoluble coloring material, water, an anionic dispersing agent, and an alkylene oxide adduct of phytosterols and/or an alkylene oxide adduct of cholestanols, and said ink composition is characterized by further comprising an organic solvent in addition to the above components.

18 Claims, No Drawings

AQUEOUS DISPERSION, INK COMPOSITION AND INKJET RECORDING METHOD USING SAME

TECHNICAL FIELD

The present invention relates to an aqueous dispersion comprising a water-insoluble coloring material, an anionic dispersing agent, and at least one kind of alkylene oxide adducts selected from the group consisting of alkylene oxide adducts of phytosterols and alkylene oxide adducts of cholestanols, and an ink composition further comprising a water-soluble organic solvent. More specifically, the present invention relates to an aqueous ink composition for inkjet using said dispersion or comprising each of the above components, a recording method, dyeing method and coloring method by means of ink-jetting using said ink composition.

BACKGROUND ART

Inkjet printing has been widely spread as a printer for office use and domestic use, in a trend of progressing digitalization of information, and recently a lot of trials are promoted to expand applications thereof further to commercial printing, textile printing, etc. Regarding to a coloring material to be used for the ink, together with spreading in use of the inkjet printing, various kinds of coloring materials have come into practical use covering from the conventional water-soluble dyes such as acidic dye or direct dye and the like to water-insoluble coloring materials such as disperse dye and pigment and the like corresponding to applications thereof.

Meanwhile, disperse dye has been widely used in the industrial dyeing of hydrophobic fibers such as polyesters, where a water-insoluble dye is used for dyeing by dispersing in a dyeing bath or a coloring paste. A dye penetrates and diffuses into a fiber under a high temperature condition, and fixed by means of hydrogen bond, intermolecular force, etc. between the fiber and the dye. A dye inferior in dispersibility, in particular, at a high temperature tends to aggregate in a dyeing bath at a high temperature to form a speck on a fiber. For this reason, conventionally a dispersing agent superior in high temperature dispersibility, for example, an anionic dispersing agent such as formaldehyde condensates of lignin sulfonic acid, formaldehyde condensates of alkylnaphthalene sulfonic acid and formaldehyde condensates of creosote oil sulfonic acid had been mainly used.

Further, inkjet printing to polyester fiber using a disperse dye has been also carried out (see, for example, Non-Patent Literature 1 and Non-Patent Literature 2), and mainly, a direct printing method where a dye ink is given (printed) to a fiber followed by fixing of the dye by heat treatment such as steaming, and a thermal transfer printing method where after a dye ink is given (printed) to an intermediate recording medium (a special transfer paper) the dye is transferred by sublimation from the intermediate recording medium to a fiber, have been practically utilized. In order to disperse the disperse dye inks used in these printing methods, an anionic dispersing agent, which has been conventionally used for industrial dyeing, is utilized (see, for example, Patent Literature 1 and Patent Literature 2). In addition, Patent Literature 3 discloses use of an ethylene oxide adduct of linear alkyl as a dispersing agent.

However, none of these compounds satisfied settling stability and shelf life stability of an aqueous dispersion and an ink composition, as well as jetting stability of an ink composition from printer.

Further, Patent Literature 4 exemplifies polyoxyethylene phytosterol together with polyoxyethylene alkyl ether, etc. as one of nonionic surfactants which are used as a surface tension regulator to be used for an ink for inkjet recording, however, specific example of use thereof, etc. has not been disclosed at all.

Patent Literature 1: JP-A-H9-291235
Patent Literature 2: JP-A-H8-333531
Patent Literature 3: JP-A-2003-246954
Patent Literature 4: JP-A-2001-329196
Non-Patent Literature 1: Journal of the Imaging Society of Japan, Vol. 41, No. 2, p. 68-74 (2002)
Non-Patent Literature 2: Senshoku Keizai Shimbun, 28th Jan. 2004, P. 18-21.

DISCLOSURE OF INVENTION

Problem to be Solved by the Invention

An object of the present invention is to provide an aqueous dispersion comprising a water-insoluble coloring material superior in shelf life stability, and also to provide an ink composition having superior shelf life stability and jetting stability of ink, and a method for inkjet recording using the same.

Means for Solving the Problem

The present inventors have, after intensively studying a way to solve the above problem, found that shelf life stability of a dispersion and shelf life stability and jetting stability of an ink using the dispersion can be significantly improved by dispersing using a specified dispersing agent in addition to an anionic dispersing agent, and completed the present invention. Thus, the present invention relates to:

(1) An aqueous dispersion characterized by comprising a water-insoluble coloring material, water, an anionic dispersing agent, and at least one kind of compounds selected from the group consisting of ethylene oxide adducts of phytosterols and ethylene oxide adducts of cholestanols;

(2) The aqueous dispersion according to the above item (1), wherein a water-insoluble coloring material is 10 to 25% by mass and an anionic dispersing agent is 3 to 25% by mass based on the whole aqueous dispersion, at least one kind of compounds selected from the group consisting of ethylene oxide adducts of phytosterols and ethylene oxide adducts of cholestanols is 3 to 45% by mass based on the anionic dispersing agent, and the rest is water;

(3) The aqueous dispersion according to the above item (2), wherein at least one kind of compounds selected from the group consisting of ethylene oxide adducts of phytosterols and ethylene oxide adducts of cholestanols is 1 to 10% by mass;

(4) The aqueous dispersion according to any one of the above items (1) to (3), wherein the water-insoluble coloring material is at least one kind of dye selected from the group consisting of disperse dyes and oil-soluble dyes;

(5) An ink composition comprising the aqueous dispersion according to any one of the above items (1) to (3) and a water-soluble organic solvent;

(6) The ink composition according to the above item (5), comprising at least one kind of polysiloxane type of compounds;

(7) The ink composition according to the above item (5) or (6), comprising 10 to 30% by mass of glycerin as a water-soluble organic solvent;

(8) The ink composition according to any one of the above items (0.5) to (7), wherein surface tension thereof at 25° C. is in a range from 20 to 40 mN/m and viscosity thereof at 25° C. is in a range from 2 to 10 mPa·s;

(9) A method for inkjet recording using the ink composition according to any one of the above items (5) to (8);

(10) A recorded article obtained by means of the method for inkjet recording according to the above item (9);

(11) A method for inkjet dyeing characterized by fixing a coloring material to the hydrophobic fiber by means of steaming or baking treatment after providing the ink composition according to any one of items 5 to 8 to a hydrophobic fiber by means of an inkjetting.

(12) A dyed article obtained by means of the method for inkjet dyeing according to the above item (11);

(13) A method for inkjet coloring characterized by performing an inkjet recording using the ink composition according to any one of the above items (5) to (8) on an intermediate recording medium to obtain a recorded image and then by transferring said recorded image from the intermediate recording medium to a hydrophobic material by means of heat treatment;

(14) A colored article obtained by means of the method for inkjet coloring according to the above item (13);

(15) An aqueous dispersion comprising 3 to 35% by mass of a water-insoluble coloring material, 1 to 35% of an anionic dispersing agent, 0.1 to 15% by mass of at least one kind of compounds selected from the group consisting of alkylene oxide adducts of phytosterols and alkylene oxide adducts of cholestanols, and the rest is water, based on the whole aqueous dispersion;

(16) The aqueous dispersion according to the above item (15) further comprising a water-soluble organic solvent;

(17) An ink composition comprising a water-insoluble coloring material, water, an anionic dispersing agent, at least one kind of compounds selected from the group consisting of alkylene oxide adducts of phytosterols and alkylene oxide adducts of cholestanols, and a water-soluble organic solvent;

(18) The ink composition according to the above item (17), wherein the alkylene oxide adduct is an ethylene oxide adduct;

(19) A method for producing an ink composition characterized by mixing an aqueous dispersion comprising a water-insoluble coloring material, water, an anionic dispersing agent, and at least one kind of compounds selected from the group consisting of alkylene oxide adducts of phytosterols and alkylene oxide adducts of cholestanols, with a water-soluble organic solvent.

EFFECT OF THE INVENTION

According to the present invention, an aqueous dispersion and an ink composition containing a water-insoluble coloring material, both of which are very superior in shelf life stability can be obtained, and further an ink composition, which is also superior in jetting stability, can be obtained.

BEST MODE FOR CARRYING OUT THE INVENTION

The water-insoluble coloring material to be used in the present invention is not particularly limited, so long as it can be used as a water-insoluble coloring agent. For example, known disperse dyes, oil-soluble dyes, carbon black, organic pigments, and the like can be used. For the method for inkjet dyeing of the present invention (direct printing), a high sublimation type disperse dye having an aptitude for steaming is preferably used, and specifically includes C.I. Disperse Yellow 42, 49, 76, 83, 88, 93, 99, 119, 126, 160, 163, 165, 180, 183, 186, 198, 199, 200, 224, 237; C.I. Disperse Orange 29, 30, 31, 38, 42, 44, 45, 53, 54, 55, 71, 73, 80, 86, 96, 118, 119; C.I. Disperse Red 73, 88, 91, 92, 111, 127, 131, 143, 145, 146, 152, 153, 154, 179, 191, 192, 206, 221, 258, 283, 302, 323, 328, 359; C.I. Disperse Violet 26, 35, 48, 56, 77, 97; C.I. Disperse Blue 27, 54, 60, 73, 77, 79, 79:1, 87, 143, 165, 165:1, 165:2, 181, 185, 197, 225, 257, 266, 267, 281, 341, 353, 354, 358, 364, 365, 368; and the like. These dyes may be used alone or in combination of 2 or more kinds.

Further, in the method for inkjet coloring of the present invention (thermal transfer printing), known disperse dyes and oil-soluble dyes can be used. Among them, a dye having an aptitude for thermal transfer is preferably used, and examples of such dye include C.I. Disperse Yellow 51, 54, 60; C.I. Disperse Orange 5, 7, 20, 23; C.I. Disperse Red 50, 53, 59, 60, 239, 240; C.I. Disperse Violet 8, 11, 17, 26, 27, 28, 36; C.I. Disperse Blue 3, 5, 26, 35, 55, 56, 72, 81, 91, 108, 359; C.I. Solvent Yellow 114, C.I. Solvent Orange 67, C.I. Solvent Red 146, C.I. Solvent Blue 36, 63, 83, 105, 111; and the like. These dyes may be used alone or in combination of 2 or more kinds.

As the pigment, carbon black and known organic pigments can be used, and preferable examples include C.I. Pigment Yellow 74, 120, 128, 138, 151, 185, 217; C.I. Pigment Orange 13, 16, 34, 43; C.I. Pigment Red 122, 146, 148; C.I. Pigment Violet 19, 23; C.I. Pigment Blue 15, 15:1, 15:2, 15:3, 15:4, 15:5, 15:6; C.I. Pigment Green 7, 8; and the like. These pigments may be used alone or in combination of 2 or more kinds.

These coloring materials may be powdery or aggregated dry coloring material, or in a form of wet cake or slurry. Such coloring material that has been added with a dispersing agent such as a surfactant for the purpose of inhibiting aggregation of coloring material particles during or after synthesis of the coloring material, may also be used. These coloring materials on the market are classified to several grades such as for industrial dyeing, for resin coloring, for ink, for toner, for inkjet, etc., and each grade is different in production process, purity, particle size of pigment, etc. from each other. To inhibit aggregation after pulverization, preferably said coloring material has a small particle size. In addition, to minimize an adverse effect on dispersion stability and discharging accuracy of ink, preferably the coloring material contains least possible amount of impurity.

Concerning the above dye, a mixture dyes mixed a blue dye in large part with an orange dye and a red dye, can be used for said coloring material for black color. Further, said coloring material for black color may contain other water-insoluble coloring material within a range of color tone adjustment.

The compound of alkylene oxide adducts of phytosterols to be used in the present invention may include preferably C2-C4 alkylene oxide adducts of phytosterols, and more preferably ethylene oxide adducts of phytosterols. In the present invention, phytosterols mean any one of phytosterols and hydrogenated phytosterols, thus, for example, ethylene oxide adducts of phytosterols may include an ethylene oxide adduct of phytosterol and an ethylene oxide adduct of hydrogenated phytosterol. Examples of the alkylene oxide adducts of cholestanols may include preferably C2-C4 alkylene oxide adducts of, and more preferably ethylene oxide adducts of cholestanols. In the present invention, cholestanols mean any one of cholestanol and hydrogenated cholestanol, thus, for example, ethylene oxide adducts of cholestanols may include an ethylene oxide adduct of cholestanol and an ethylene oxide adduct of hydrogenated cholestanol. Addition amount of alkylene oxide, preferably C2-C4 alkylene oxide, and more preferably ethylene oxide per 1 mole of phytosterols or cholestanols is around 10 to 50 moles, and HLB value thereof is preferably around 13 to 20.

The ethylene oxide adducts of phytosterols are commercially available as, for example, NIKKOL® BPS-20 and NIKKOL® BPS-30 (both made by Nikko Chemicals Co., Ltd., EO adducts of phytosterol), NIKKOL® BPSH-25 (made by the same company, EO adducts of hydrogenated phytosterol). The ethylene oxide adducts of cholestanols are commercially available as, for example, NIKKOL® DHC-30 (made by the same company, EO adducts of cholestanol).

The anionic dispersing agent is not particularly limited and preferably those used for ink for inkjet are commonly used. For example, polymer type of sulfonic acids, preferably formaldehyde codensates of aromatic sulfonic acids, formaldehyde codensates of lignin sulfonic acid, and the like are used. In this connection, "sulfonic acid" concerning aromatic sulfonic acid, etc. in the present invention is used including salts thereof. Formaldehyde codensates of aromatic sulfonic acids include, for example, formaldehyde codensate of creosote oil sulfonic acid, formaldehyde codensate of cresol sulfonic acid, formaldehyde codensate of phenol sulfonic acid, formaldehyde codensate of β-naphthol sulfonic acid, formaldehyde codensate of β-naphthalene sulfonic acid and β-naphthol sulfonic acid, and formaldehyde codensate of cresol sulfonic acid and 2-naphthol-6-sulfonic acid. All of these codensates are used including salts thereof such as sodium salts. Among them, for example, formaldehyde codensate of creosote oil sulfonic acid, formaldehyde codensate of naphthalene sulfonic acid, formaldehyde codensates of lignin sulfonic acid, and the like are more preferable.

These compounds are commercially available, and formaldehyde codensates of aromatic sulfonic acid (salt) include, for example, DEMOL® (product name, made by Kao Corp.), DEMOL® C (product name, made by Kao Corp.), DEMOL® SNB (product name, made by Kao Corp.) which is a sodium salt of formaldehyde codensate of particular aromatic sulfonic acid, and the like.

The aqueous dispersion of the present invention can be obtained by properly stirring and mixing a water-insoluble coloring material with water, an anionic dispersing agent and at least one kind of compounds selected from the group consisting of alkylene oxide adducts of phytosterols and alkylene oxide adducts of cholestanols, while or after pulverizing finely the water-insoluble coloring material if necessary, to afford a slurry containing dispersed water-insoluble coloring material, followed by filtration and adjustment of concentration by dilution with water if necessary. The above alkylene oxide adducts include preferably C2-C4 alkylene oxide adduct, more preferably ethylene oxide adduct. In addition, usually the above stirring and mixing is preferably performed while pulverizing finely the water-insoluble coloring material.

Concentration of the water-insoluble coloring material in a slurry during dispersing is usually 15 to 35% by mass (hereinafter, % in the present invention means % by mass unless otherwise specified), and concentration of the anionic dispersing agent is 5 to 35%, and dispersing is preferably performed using the at least one kind of compounds (dispersing agent) selected from the group consisting of alkylene oxide adducts, preferably ethylene oxide adducts of phytosterols and alkylene oxide adducts, preferably ethylene oxide adducts of cholestanols of usually 3 to 45% by mass based on the anionic dispersing agent in the total concentration of the dispersing agents (the aforementioned alkylene oxide adduct+anionic dispersing agent) of around 30 to 150%, preferably around 30 to 120%, and optionally around 30 to 100% by mass based on the coloring material. The rest is water. After dispersing or post-treatment such as filtration, the dispersion is diluted with water to adjust coloring material concentration to a desired level if necessary, to obtain the aqueous dispersion of the present invention. In the present application, the slurry after dispersing but before dilution is also included in the aqueous dispersion of the present invention.

In the aqueous dispersion obtained by diluting the slurry after dispersing with water if necessary, the water-insoluble coloring material is generally 1 to 35%, preferably 2 to 30%, and optionally 10 to 25% by mass, the anionic dispersing agent is generally 1 to 35%, preferably 2 to 30%, and more preferably 3 to 25% by mass, and the alkylene oxide adduct, preferably ethylene oxide adduct of phytosterols and/or the alkylene oxide adduct, preferably ethylene oxide adduct of cholestanols may be generally 0.1 to 15%, preferably 0.2 to 10%, further preferably 0.4 to 10%, and optionally 1 to 10% by mass, and the rest is water. Further, said aqueous dispersion may contain an additive other than the above if necessary depending on a purpose to be used. Content of the additive is not particularly limited so long as character of said aqueous dispersion can be maintained, but generally around 0 to 20%, and preferably 0 to 10%.

In the above step, a method for mixing the water-insoluble coloring material with other components while the coloring material is finely pulverized can include stirring and mixing methods known per se using sand mill (beads mill), roll mill, ball mill, paint shaker, ultrasonic dispersing device, microfluidizer, etc. Among those, sand mill (beads mill) is preferable. In addition, in pulverization of the coloring material using the sand mill (beads mill), preferably the coloring material is treated under the conditions giving enhanced pulverization efficiency such as use of beads with a small diameter and pulverizing at a high filling rate. Further, it is preferable to remove beads or coarse particles used for dispersing by means of filtration, centrifugal separation, etc. after pulverization. Furthermore, since some of dispersing agents have foaming property, pulverization is performed preferably under the condition in which foaming during pulverization is suppressed as much as possible to raise pulverization efficiency, and in some instances, an antifoaming agent of silicone type or acetylene alcohol type and the like may be used by adding in trace amount in pulverizing of pigment. In this regard, however, since some antifoaming agents may inhibit dispersion and pulverization, it is preferable to use those not effecting on pulverization and stability after dispersion.

Preferable particle size of the water-insoluble coloring material in the aqueous dispersion of the present invention obtained in such way is generally 50 to 150 nm.

The aqueous dispersion of the present invention obtained in such way may further contain a water-soluble organic solvent, and, if necessary, water and other additives, and the aqueous dispersion containing these components can be used as an ink composition of the present invention. The aqueous dispersion to be used for an ink composition may be prepared by mixing the above-described water-soluble organic solvent and ink additives to be added if necessary together with the above-described water-insoluble coloring material and other components when the above-described water-insoluble coloring material and other components are mixed. However, preferably the aqueous dispersion to be used for an ink composition is prepared by adding the water-soluble organic solvent and the ink additives to be added if necessary to an aqueous dispersion not containing these components. In this case, the above-described coloring material is contained in a range of preferably 0.3 to 10%, more preferably around 1 to 10%, and further preferably 3 to 10% in the ink composition. Further, content of the anionic dispersing agent in the ink composition is 1 to 10%, and content of an alkylene oxide adduct of phytosterols and/or an alkylene oxide adduct of cholrstanols is generally 0.1 to 3%, and the rest is an additive for ink to be added if necessary and water.

The water-soluble organic solvent is preferably those which have wetting effect for the purpose of preventing clogging at the nozzle. Said water-soluble organic solvent can include polyhydric alcohols, pyrrolidones, and the like. As polyhydric alcohols, for example, C2-C6 polyhydric alcohols having two or three alcoholic hydroxyl groups, di- or tri-(C2-C3)alkylene glycol or poly(C2-C3)alkylene glycol having repeating units of not less than 4 and a molecular weight not more than 20,000, preferably a liquid polyalkylene glycol and the like are mentioned. Specific examples of these compounds include polyhydric alcohols such as ethylene glycol, diethylene glycol, triethylene glycol, propylene glycol, polyethylene glycol, polypropylene glycol, glycerin, trimethylolpropane, 1,3-pentanediol and 1,5-pentanediol; 2-pyrrolidone, N-methyl-2-pyrrolidone, and the like. Further, in the present invention, a compound which serves as a wetting agent by dissolving in water, is also expediently included in the water-soluble organic solvent, and those include, for example, urea, ethylene urea, saccharide, and the like. In view of shelf life stability, solvents, in which dispersing dyes and oil-soluble dyes have low solubility, are preferable, and among these, particularly glycerin and other solvents, preferably a liquid polyhydric alcohol other than glycerin is used in combination. Content of the water-soluble organic solvent(s) (sum of them, when plural solvents are used) to be added is 5 to 40% by mass, and preferably 10 to 30% by mass in ink.

The aqueous ink composition for inkjet recording of the present invention preferably have viscosity of generally 2 to 10 mPa·s at 25° C. measured with an E type viscometer, and surface tension of generally a range from 20 to 40 mN/m measured by the plate method, from the viewpoint of jetting responsibility at a high speed. In more detail, these physical properties should be adjusted to appropriate values, considering jetting amount, speed of response, and flying characteristics of ink drop of a printer to be used. Preferably, viscosity is adjusted by amounts of the dispersing agent and the water-soluble organic solvent, and surface tension is adjusted by silicone type or acetylene alcohol type antifoaming agent, or the like. Further, in the ink composition of the present invention, an antiseptic and fungicide, a pH adjuster, etc. may be contained as the other additives. These additives are generally around 0 to 10%, and preferably around 0.05 to 5% in total based on the whole ink composition. The antiseptic and fungicide includes, for example, sodium dehydroacetate, sodium benzoate, sodium pyridinethione-1-oxide, zinc pyridinethione-1-oxide, 1,2-benzisothiazoline-3-one and amine salts of 1-benzisothiazoline-3-one, and the like, and the pH adjuster includes, for example, alkali hydroxides such as sodium hydroxide, potassium hydroxide and lithium hydroxide; tertiary amines such as triethanolamine, diethanolamine, dimethylethanolamine and diethylethanolamine; and the like. The ink composition of the present invention can be prepared by dispersing or mixing each of the above components in water as appropriate using a method known per se such as stirring and mixing with a homogenizer, etc.

A preferable example of composition of the aqueous dispersion of the present invention is as describe below.

| (1) Water-insoluble coloring material | 1 to 35% |
| (2) Anionic dispersing agent | 1 to 35% |
| (3) At least one kind of compounds selected from the group consisting of alkylene oxide adducts of phytosterols and alkylene oxide adducts of cholestanols | 0.1 to 15%, preferably 0.2 to 10% |
| (4) Water-soluble organic solvent | 0 to 40% |
| (5) Other additives | 0 to 10% |
| (6) Water | rest |

Furthermore, in the ink composition of the present invention, for the purpose to improve jetting responsibility in inkjet, a polysiloxane type compound is preferably added as one of the other additives if necessary. The polysiloxane type compound includes, for example, polyether-modified siloxane and polyether-modified polydimethylsiloxane, which are commercially available as BYK-347 (product name, made by BYK Chemie, polyether-modified siloxane), BYK-348 (product name, made by the same company, polyether-modified polydimethylsiloxane), and the like. In addition, these compounds can be utilized for adjusting surface tension of the ink.

The method for inkjet recording of the present invention is characterized in that recording is performed on an image-receiving material using the above-described dispersion of the present invention, preferably the ink composition of the present invention, more preferably an ink for inkjet comprising said ink composition. Ink nozzle, etc. to be used in the recording are not particularly limited, and may be selected as appropriate depending on the purpose. The image-receiving material is not particularly limited so long as the material allows recording by means of inkjet, and includes known materials to be recorded thereon such as plain paper, resin-coated paper, special paper for inkjet, film, common paper for electronic photography, fabric, glass, metal, ceramics, and the like.

As a dyeing method and a color fixing method using the method for inkjet recording of the present invention, a method for inkjet dyeing and a method for inkjet coloring can be mentioned. The method for inkjet dyeing of the present invention includes a direct printing method, where, in the above method for inkjet recording, a hydrophobic fiber, for example, a polyester fiber is used as an image-receiving material, recording is performed thereon, then the fiber is subjected to steaming or baking treatment using a known method to fix a dye in the ink into the polyester fiber. The steaming is conducted generally at 170 to 180° C. for generally around 10 minutes for the case of a high temperature steamer, and generally at 120 to 130° C. for generally around 20 minutes for the case of a high pressure steamer to fix the dye (wet heat fixation). The baking (thermosol) is conducted generally at 190 to 210° C. for generally around 60 to 120 seconds to fix the dye (dry heat fixation). Further, in any method, it is preferable to wash off unfixed dye remaining on the surface of fiber by a known method such as alkaline reduction cleaning, soaping, etc. from the viewpoint of fastness of the fiber. Thus, a dyed article of the present invention can be obtained by means of the method for inkjet dyeing of the present invention.

Specific examples of said hydrophobic fiber include, for example, polyester fiber, nylon fiber, triacetate fiber, diacetate fiber, polyamide fiber and blended fibers using 2 or more types of these fibers. Further, those also included may be blended fibers of these fibers with regenerated fibers such as rayon or with natural fibers such as cotton, silk and wool. These hydrophobic fibers are preferably provided thereon with an ink-receiving layer (anti-bleeding layer). Method for forming this ink-receiving layer is within publicly known technology, and this fiber having an ink-receiving layer is freely available from the market. Alternatively, said hydrophobic fiber can be provided with an ink-receiving layer by appropriately selecting constituents and a forming method from the publicly known technology and using them. Said ink-receiving layer is not particularly limited so long as the layer has the function.

The method for inkjet coloring of the present invention includes a sublimation transfer printing method, where, in the above-described method for inkjet recording, an intermediate recording medium is used as a recording material, recording is performed thereon, then the medium is overlapped with a hydrophobic material and subjected to dry heat treatment generally at 190 to 200° C. to transfer and fix a dye in the ink from the surface of the intermediate transfer medium to the hydrophobic material. Thus, a colored article of the present invention can be obtained by means of the method for inkjet coloring of the present invention.

The intermediate recording medium is preferably a paper on which an ink-receiving layer is formed with a material which does not allow dye to aggregate on the surface thereof in an ink drying process such as evaporation of water after printing, and also does not obstruct sublimation of dye during the transferring, for example, inorganic fine particles like silica, and a special paper for inkjet, and the like can be used.

The hydrophobic material includes the above hydrophobic fiber, film composed of a hydrophobic resin, fabric coated with a hydrophobic resin, glass, metal, ceramics, and the like.

Meanwhile, the intermediate recording medium on which an inkjet recording has been applied using the ink composition of the present invention is also included in a recorded article of the present invention.

According to the present invention, an aqueous dispersion and an ink composition of a water-insoluble coloring material extremely superior in shelf life stability, and also an ink composition superior in jetting stability can be obtained. By appropriately selecting a water-insoluble coloring material from those suitable to hydrophobic fiber or hydrophobic material, a dyed article or a colored article can be obtained by applying the method for inkjet recording of the present invention without impairing various properties such as hue and fastness of the water-insoluble coloring material used.

Hereinafter, the present invention will be further described in detail with reference to Examples, but the present invention is not limited by these Examples. In the Examples, parts means parts by mass, and % means % by mass, unless otherwise specified.

EXAMPLE 1

The following components in the following composition ratio were subjected to a dispersing treatment using a sand mill with glass beads having a diameter of 0.2 mm under water cooling condition for about 15 hours, and 150 parts of ion-exchanged water was added thereto after completion of the dispersing treatment, to prepare an aqueous dispersion having dye concentration of 10%. Said dispersion was then filtered with a glass fiber filter paper GC-50 (made by Toyo Roshi Kaisha Ltd.) to remove coarse particles and obtain an aqueous dispersion. Dye concentration of said aqueous dispersion was about 10%, and average particle size and viscosity thereof were 99 nm and 2.5 mPa·s, respectively.

TABLE 1

| | |
|---|---|
| Kayaset Red$^{RTM}$ B (Note 1) | 25 parts |
| LAVELIN W$^{RTM}$ (Note 2) | 15 parts |
| NIKKOL$^{RTM}$ BPS-30 (Note 3) | 6 parts |
| 10% SURFINOL$^{RTM}$ 104PG (Note 4) | 0.6 parts |
| Ion-exchanged water | 53.4 parts |

(Note 1): made by Nippon Kayaku Co., Ltd., C.I. Disperse Red 60.
(Note 2): made by Daiichi Kogyo Seiyaku Co., Ltd., powder of formaldehyde condensate of creosote oil sulfonic acid (15 parts of said condensate powder was made into 40% aqueous solution with ion-exchanged water and the solution was mixed).
(Note 3): made by Nikko Chemicals Co., Ltd., EO (30) adduct of phytosterol.
(Note 4): made by Air Products and Chemicals, Inc., acetylene alcohol type antifoaming agent, added after 10 times dilution with propylene glycol.

EXAMPLE 2

An ink composition of the present invention of red color was prepared by mixing in the following formulation, and was pressure-filtrated with a filter of 0.8µ (DISMIC 25CS080AN) to obtain an ink composition for printing. Viscosity, average particle size and surface tension thereof were 3.5 mPa·s, 90 nm, and 37.9 mN/m, respectively. The resultant ink composition was printed on a PPC paper using a commercially available printer (made by Seiko Epson Corp., PM-740C), and jetting property was evaluated. Similarly, the ink composition was printed on a fine paper made by Seiko Epson Corp., followed by executing a heat treatment with a tester at 190° C. for 90 seconds while overlapped with a polyester taffeta, to transfer the printed image to the polyester taffeta in brilliant magenta color.

Fastnesses the transferred and dyed polyester taffeta were as follows;

light fastness (JIS L-0842, carbon)=Class 4 or higher, water fastness (JIS L-0846), A) discoloration and fading=Class 4 to 5, water fastness (JIS L-0846), A) PET staining=Class 4 to 5, and these were practicable levels for clothing use (PET=polyethylene terephthalate).

Viscosity and surface tension were measured using R-115 viscometer (E type) made by Toki Sangyo Co., Ltd. and CBVP-Z surface tension meter (plate method) made by Kyowa Interface Science Co., Ltd., respectively. Concerning average particle size, a volume average median diameter was measured using a particle size distribution measuring apparatus LB-500 (made by Horiba Ltd.) after diluting the ink composition with ion-exchanged water to coloring material concentration of 0.5% by mass.

Furthermore, determinations were made using JIS blue scale for determination of light fastness, JIS discoloration and fading gray scale for determination of discoloration and fading in water fastness, and JIS staining gray scale for determination of PET staining in water fastness.

Hereinafter determinations were made similarly.

TABLE 2

| | |
|---|---|
| Dispersion of Example 1 | 250 parts |
| Glycerin | 100 parts |
| Diethylene glycol | 50 parts |
| 10% SURFINOL$^{RTM}$ 104PG | 0.5 parts |
| Ion-exchanged water | 99.5 parts |

EXAMPLE 3

An ink composition for printing of red color was prepared using the following formulation similarly as in Example 2. Viscosity, average particle size and surface tension of the ink composition were 3.7 mPa·s, 80 nm, and 27.5 mN/m, respectively. The resultant ink was printed on a PPC paper using a commercially available printer (made by Seiko Epson Corp., PM-740C), and jetting property was evaluated.

TABLE 3

| | |
|---|---|
| Dispersion of Example 1 | 250 parts |
| Glycerin | 100 parts |
| Diethylene glycol | 50 parts |
| BYK-348 (Note 5) | 2 parts |
| Ion-exchanged water | 98 parts |

(Note 5): product name, made by BYK Chemie, surface tension regulator.

EXAMPLE 4

An ink composition for printing of red color was prepared using the following formulation similarly as in Example 2. Viscosity, average particle size and surface tension of the ink composition were 4.0 mPa·s, 93 nm, and 27.6 mN/m, respectively. The resultant ink was printed on a PPC paper using a commercially available printer (made by Seiko Epson Corp., PM-740C), and jetting property was evaluated.

TABLE 4

| | |
|---|---|
| Dispersion of Example 1 | 250 parts |
| Glycerin | 100 parts |
| Propylene glycol | 50 parts |
| BYK-348 | 2 parts |
| Ion-exchanged water | 98 parts |

EXAMPLE 5

The following components in the following ratio were subjected to a dispersing treatment, dilution with ion-exchanged water, and filtration similarly as in Example 1, to obtain an aqueous dispersion. Concentration of dye in this aqueous dispersion was 10%. Average particle size and viscosity thereof were 133 nm and 2.3 mPa·s, respectively.

TABLE 5

| | |
|---|---|
| Kayaset Red$^{RTM}$ B | 25 parts |
| DEMOL$^{RTM}$ N (Note 6) | 15 parts |
| NIKKOL$^{RTM}$ BPS-30 | 6 parts |
| 10% SURFINOL$^{RTM}$ 104PG | 0.6 parts |
| Ion-exchanged water | 53.4 parts |

(Note 6): made by Kao Corp., formaldehyde condensate of naphthalene sulfonic acid.

EXAMPLE 6

The following components in the following ratio were subjected to a dispersing treatment, dilution with ion-exchanged water, and filtration similarly as in Example 1, to obtain an aqueous dispersion. Concentration of dye in this aqueous dispersion was 10%. Average particle size and viscosity thereof were 110 nm and 2.5 mPa·s, respectively.

TABLE 6

| | |
|---|---|
| Kayaset Red$^{RTM}$ B | 25 parts |
| LAVELIN W$^{RTM}$ | 15 parts |
| NIKKOL$^{RTM}$ BPSH-25 | 6 parts |
| 10% SURFINOL$^{RTM}$ 104PG | 0.6 parts |
| Ion-exchanged water | 53.4 parts |

EXAMPLE 7

The following components in the following ratio were subjected to a dispersing treatment, dilution with ion-exchanged water, and filtration similarly as in Example 1, to obtain an aqueous dispersion. Concentration of dye in this aqueous dispersion was 10%. Average particle size and viscosity thereof were 92 nm and 3.2 mPa·s, respectively.

TABLE 7

| | |
|---|---|
| Kayaset Red$^{RTM}$ B | 25 parts |
| LAVELIN W$^{RTM}$ | 15 parts |
| NIKKOL$^{RTM}$ BPSH-25 | 1 part |
| 10% SURFINOL$^{RTM}$ 104PG | 0.6 parts |
| Ion-exchanged water | 58.4 parts |

EXAMPLE 8

An ink composition for printing of red color was prepared using the following formulation similarly as in Example 2. Viscosity, average particle size and surface tension of the ink composition were 3.7 mPa·s, 94 nm, and 27.8 mN/m, respectively. The resultant ink was printed on a PPC paper using a commercially available printer (made by Seiko Epson Corp., PM-740C), and jetting property was evaluated.

TABLE 8

| | |
|---|---|
| Dispersion of Example 7 | 250 parts |
| Glycerin | 100 parts |
| Propylene glycol | 50 parts |
| BYK-348 | 2 parts |
| Ion-exchanged water | 98 parts |

EXAMPLE 9

The following components in the following ratio were subjected to a dispersing treatment, dilution with ion-exchanged water, and filtration similarly as in Example 1, to obtain an aqueous dispersion. Concentration of dye in this aqueous dispersion was 10%. Average particle size and viscosity thereof were 95 nm and 4.0 mPa·s, respectively.

TABLE 9

| | |
|---|---|
| Kayaset Yellow$^{RTM}$ A-G (Note 7) | 25 parts |
| LAVELIN W$^{RTM}$ | 15 parts |
| NIKKOL$^{RTM}$ BPSH-25 | 1 part |
| 10% SURFINOL$^{RTM}$ 104PG | 0.6 parts |
| Ion-exchanged water | 58.4 parts |

(Note 7): made by Nippon Kayaku Co., Ltd., C.I. Disperse Yellow 54

EXAMPLE 10

An ink composition for printing of yellow color was prepared by using the following formulation similarly as in Example 2. Viscosity, average particle size and surface tension thereof were 3.8 mPa·s, 95 nm, and 25.0 mN/m, respectively. The resultant ink was printed on a PPC paper using a commercially available printer (made by Seiko Epson Corp., PM-740C), and jetting property was evaluated.

Similarly, the ink composition was printed on a fine paper made by Seiko Epson Corp., followed by executing a heat treatment with a tester at 190° C. for 90 seconds while overlapped with a polyester taffeta, to transfer the printed image to the polyester taffeta in brilliant yellow color. Fastnesses of the transferred and dyed polyester taffeta were as follows;

light fastness (JIS L-0842, carbon)=Class 4 or higher, water fastness (JIS L-0846A)

Discoloration and fading=Class 5, and PET staining=Class 4 to 5, and these were sufficiently practicable levels for clothing use.

TABLE 10

| | |
|---|---|
| Dispersion of Example 9 | 250 parts |
| Glycerin | 100 parts |
| Diethylene glycol | 50 parts |
| BYK-348 | 2 parts |
| Ion-exchanged water | 98 parts |

EXAMPLE 11

The following components in the following ratio were subjected to dispersing treatment, dilution with ion-exchanged water, and filtration similarly as in Example 1, to obtain an aqueous dispersion. Concentration of dye in this aqueous dispersion was 10%. Average particle size and viscosity thereof were 74 nm and 2.5 mPa·s, respectively.

TABLE 11

| | |
|---|---|
| Kayaset Blue$^{RTM}$ A-2R (Note 8) | 25 parts |
| LAVELIN W$^{RTM}$ | 15 parts |
| NIKKOL$^{RTM}$ DHC-30 | 6 parts |
| 10% SURFINOL$^{RTM}$ 104PG | 0.6 parts |
| Ion-exchanged water | 53.4 parts |

(Note 8): made by Nippon Kayaku Co., Ltd., C.I. Solvent Blue 83.

EXAMPLE 12

An ink composition for printing of blue color was prepared by using the following formulation similarly as in Example 2. Viscosity, average particle size and surface tension thereof were 3.9 mPa·s, 85 nm, and 26.9 mN/m, respectively. The resultant ink was printed on a PPC paper using a commercially available printer (made by Seiko Epson Corp., PM-740C), and jetting property was evaluated.

TABLE 12

| | |
|---|---|
| Dispersion of Example 11 | 250 parts |
| Glycerin | 100 parts |
| Diethylene glycol | 50 parts |
| BYK-348 | 2 parts |
| Ion-exchanged water | 98 parts |

EXAMPLE 13

The following components in the following ratio were subjected to dispersing treatment, dilution with ion-exchanged water, and filtration similarly as in Example 1, to obtain an aqueous dispersion. Concentration of dye in this aqueous dispersion was 10%. Average particle size and viscosity thereof were 85 nm and 2.4 mPa·s, respectively.

TABLE 13

| | |
|---|---|
| C.I. Disperse Red$^{RTM}$ 92 (Note 9) | 25 parts |
| LAVELIN W$^{RTM}$ | 15 parts |
| NIKKOL$^{RTM}$ DHC-30 | 6 parts |
| 10% SURFINOL$^{RTM}$ 104PG | 0.6 parts |
| Ion-exchanged water | 53.4 parts |

(Note 9): made by Nippon Kayaku Co., Ltd.

EXAMPLE 14

As an paste material, 10 parts of Fine Gum® MC-8 (made by Dai-ichi Kogyo Seiyaku Co., Ltd.), 0.3 parts of citric acid, and 89.7 parts of ion-exchanged water were mixed with a mixing and grinding machine, and the resultant white paste was printed on a polyester tropical cloth in solid of 1,200 mesh screen, followed by drying at 90° C. for about 10 minutes, to prepare a pretreated PET cloth. Subsequently, an ink composition for printing was prepared by using the following formulation similarly as in Example 2. An ink composition of the present invention of red color having viscosity, average particle size and surface tension of 3.9 mPa·s, 85 nm, and 28.0 mN/m, respectively, was obtained. The resultant ink composition was filled up in a commercially available printer (made by Seiko Epson Corp., PM-740C), printed on the pretreated PET cloth, then the printed PET cloth was subjected to a treatment at 180° C. for 8 minutes with a high temperature steamer to fix the dye in the ink to the PET. The dyed cloth was washed with hot water, then with reducing solution at 80° C. (treated in a hot water containing 2 g/L of hydrosulfite and 1 g/L of NaOH) to remove unfixed dye and the paste material, to obtain a dyed article of brilliant magenta color. Fastnesses of this dyed article were as follows; light fastness (JIS L-0842, carbon)=Class 4 or higher, water fastness (JIS L-0846A)

Discoloration and fading=Class 5, and PET staining=Class 4, and these were sufficiently practicable levels for clothing use.

TABLE 14

| | |
|---|---|
| Dispersion of Example 13 | 250 parts |
| Glycerin | 100 parts |
| Diethylene glycol | 50 parts |
| BYK-348 | 2 parts |
| Ion-exchanged water | 98 parts |

COMPARATIVE EXAMPLE 1

The same procedures were repeated as in Example 1 except that NIKKOL® BPS-30 was replaced with ion-exchanged water, to obtain an aqueous dispersion having a dye concentration of 10%. Average particle size and viscosity of the dispersion were 90 nm and 1.8 mPa·s, respectively.

COMPARATIVE EXAMPLE 2

The same procedures were repeated as in Example 1 except that NIKKOL® BPS-30 was replaced with ion-exchanged water, to obtain an aqueous dispersion having a dye concentration of 10%. Average particle size and viscosity of the dispersion were 93 nm and 2.0 mPa·s, respectively.

COMPARATIVE EXAMPLE 3

An ink composition for printing of red color was prepared by using the following formulation similarly as in Example 2. Viscosity, average particle size and surface tension thereof were 3.5 mPa·s, 96 nm, and 29.8 mN/m, respectively. The resultant ink was printed on a PPC paper using a commercially available printer (made by Seiko Epson Corp., PM-740C), and jetting property was evaluated.

TABLE 15

| | |
|---|---|
| Dispersion of Comparative Example 2 | 250 parts |
| Glycerin | 100 parts |
| Diethylene glycol | 50 parts |
| BYK-348 | 2 parts |
| Ion-exchanged water | 98 parts |

COMPARATIVE EXAMPLE 4

The same procedures were repeated as in Example 5 except that NIKKOL® BPS-30 was replaced with polyoxyethylene tribenzylphenyl ether, to obtain an aqueous dispersion having a dye concentration of 10%. Average particle size and viscosity of the dispersion were 104 nm and 2.3 mPa·s, respectively.

COMPARATIVE EXAMPLE 5

An ink composition for printing of red color was prepared by using the following formulation similarly as in Example 2. Viscosity, average particle size and surface tension thereof were 3.8 mPa·s, 159 nm, and 23.9 mN/m, respectively. The resultant ink was printed on a PPC paper using a commercially available printer (made by Seiko Epson Corp., PM-740C), and jetting property was evaluated.

TABLE 16

| | |
|---|---|
| Dispersion of Comparative Example 4 | 250 parts |
| Glycerin | 100 parts |
| Diethylene glycol | 50 parts |
| BYK-348 | 2 parts |
| Ion-exchanged water | 98 parts |

COMPARATIVE EXAMPLE 6

The same procedures were repeated as in Example 5 except that NIKKOL® BPS-30 was replaced with polyoxyethylene alkyl (C=20 to 40) ether, to obtain an aqueous dispersion having average particle size, viscosity, and dye concentration of 148 nm, 2.8 mPa·s, and 10%, respectively.

COMPARATIVE EXAMPLE 7

An ink composition for printing of red color was prepared by using the following formulation similarly as in Example 2. Viscosity, average particle size and surface tension thereof were 4.5 mPa·s, 175 nm, and 26.3 mN/m, respectively. The resultant ink was printed on a PPC paper using a commercially available printer (made by Seiko Epson Corp., PM-740C), and jetting property was evaluated.

TABLE 17

| | |
|---|---|
| Dispersion of Comparative Example 6 | 250 parts |
| Glycerin | 100 parts |
| Diethylene glycol | 50 parts |
| BYK-348 | 2 parts |
| Ion-exchanged water | 98 parts |

Dispersion stabilities of the dispersions obtained in the above Examples and Comparative Examples are summarized in Table 18. Regarding dispersion stability, as an accelerated test for stability at an ordinary temperature, occurrence or non-occurrence of coloring material settling, changes in particle size and viscosity after storage, were evaluated after storage at 60° C. for one week. Evaluation of settling was judged based on the following criteria.

o: Settling was not observed.

Δ: Settling was observed a little.

x: Settling was observed considerably.

TABLE 18

| | Particle size (nm) | Viscosity (Pa · s) | Settling after 1 week at 60° C. | Particle size after 1 week at 60° C. (nm) | Viscosity after 1 week at 60° C. (Pa · s) |
|---|---|---|---|---|---|
| Example 1 | 99 | 2.5 | o | 118 | 2.5 |
| Example 5 | 133 | 2.3 | o | 143 | 2.7 |
| Example 6 | 110 | 2.5 | o | 121 | 2.6 |
| Example 7 | 92 | 3.2 | o | 115 | 2.8 |
| Example 9 | 95 | 4.0 | o | 102 | 3.5 |
| Example 11 | 74 | 2.5 | o | 69 | 2.0 |
| Comparative Example 1 | 90 | 1.8 | X | 112 | 1.7 |
| Comparative Example 2 | 93 | 2.0 | X | 123 | 2.2 |
| Comparative Example 4 | 104 | 2.3 | X | Separated | Separated |
| Comparative Example 6 | 149 | 2.8 | X | 166 | 2.8 |

As clear from Table 18, in any Example, settling was not observed, both of viscosity and particle size did not show significant change, and dispersion stability was in very superior level. On the other hand, settling was observed in every Comparative Example, and furthermore separation of dispersion was observed in Comparative Example 4.

Next, evaluation results on dispersion stabilities and jetting properties of the inks obtained in the above Examples and Comparative Examples are summarized in Table 19. For evaluation of settling, the above criteria for judgment were employed. Evaluation of jetting property was judged based on the criteria shown below.

o: When 10 sheets of A4 sized papers were printed in solid, good printing was continued until the last sheet.

Δ: In the same printing, lack of printing in a few streaks occurred.

x: In the same printing, jetting defects occurred significantly.

TABLE 19

|  | Particle size (nm) | Viscosity (mPa·s) | Surface tension (mN/m) | Settling after 1 week at 60° C. | Particle size after 1 week at 60° C. (nm) | Viscosity after 1 week at 60° C. (Pa·s) | jetting property |
|---|---|---|---|---|---|---|---|
| Example 2 | 90 | 3.5 | 47.9 | ○ | 147 | 3.4 | Δ |
| Example 3 | 80 | 3.7 | 27.5 | ○ | 147 | 3.8 | ○ |
| Example 4 | 93 | 4.0 | 27.6 | ○ | 130 | 3.8 | ○ |
| Example 8 | 94 | 3.7 | 27.8 | ○ | 124 | 3.8 | ○ |
| Example 10 | 95 | 3.8 | 25.0 | ○ | 103 | 3.4 | ○ |
| Example 12 | 85 | 3.9 | 26.9 | ○ | 85 | 3.6 | ○ |
| Comparative Example 3 | 96 | 3.5 | 29.8 | X | 216 | 3.5 | X |
| Comparative Example 5 | 159 | 3.8 | 23.9 | X | Separated | Separated | ○ |
| Comparative Example 7 | 150 | 4.5 | 26.3 | X | 174 | 4.3 | ○ |

As clear from Table 19, all of the above ink compositions of the present invention were superior in dispersion stability, as well as in jetting property. The ink compositions of Comparative Examples are all inferior in dispersion stability, and the ink composition of Comparative Example 3 was also inferior in jetting property.

EXAMPLE 15

The following components in the following ratio were subjected to dispersing treatment, diluted by adding 66.7 parts of ion-exchanged water, and then filtered similarly as in Example 1, to obtain an aqueous dispersion. Concentration of dye in this aqueous dispersion was 15%. Average particle size and viscosity thereof were 66 nm and 9.0 mPa·s, respectively.

TABLE 20

| C.I. Disperse Blue$^{RTM}$ 359 | 25.0 parts |
|---|---|
| LAVELIN$^{RTM}$ W-P (Note 10) | 25.0 parts |
| NIKKOL$^{RTM}$ BPS-30 | 1.5 parts |
| 10% SURFINOL$^{RTM}$ 104PG | 0.6 parts |
| Ion-exchanged water | 47.9 parts |

(Note 10): made by Daiichi Kogyo Seiyaku Co., Ltd., powder of formaldehyde condensate of creosote oil sulfonic acid.

EXAMPLE 16

An ink composition for printing of cyan color was prepared by using the following formulation similarly as in Example 2. Viscosity, average particle size and surface tension thereof were 3.1 mPa·s, 67 nm, and 28.0 mN/m, respectively. The resultant ink was printed on a PPC paper using a commercially available printer (made by Seiko Epson Corp., PM-740C), and jetting property was evaluated.

TABLE 21

| Dispersion of Example 15 | 166.7 parts |
|---|---|
| Glycerin | 65.0 parts |
| Propylene glycol | 45.0 parts |
| BYK-348 | 1.0 part |
| Ion-exchanged water | 222.3 parts |

EXAMPLE 17

The following components in the following ratio were subjected to dispersing treatment, diluted by adding 150 parts of ion-exchanged water, and then filtered similarly as in Example 1, to obtain an aqueous dispersion. Concentration of dye in this aqueous dispersion was 10%. Average particle size and viscosity thereof were 82 nm and 2.5 mPa·s, respectively.

TABLE 22

| Kayaset Yellow$^{RTM}$ A-G | 25.0 parts |
|---|---|
| LAVELIN$^{RTM}$ W-P | 25.0 parts |
| NIKKOL$^{RTM}$ BPS-30 | 1.5 parts |
| 10% SURFINOL$^{RTM}$ 104PG | 0.6 parts |
| Ion-exchanged water | 47.9 parts |

EXAMPLE 18

The following components in the following ratio were subjected to dispersing treatment, diluted by adding 66.7 parts of ion-exchanged water, and then filtered similarly as in Example 1, to obtain an aqueous dispersion. Concentration of dye in this aqueous dispersion was 15%. Average particle size and viscosity thereof were 84 nm and 4.7 mPa·s, respectively.

TABLE 23

| Kayaset Red$^{RTM}$ B | 25.0 parts |
|---|---|
| LAVELIN$^{RTM}$ W-P | 25.0 parts |
| NIKKOL$^{RTM}$ BPS-30 | 1.5 parts |
| 10% SURFINOL$^{RTM}$ 104PG | 0.6 parts |
| Ion-exchanged water | 47.9 parts |

EXAMPLE 19

The following components in the following ratio were subjected to dispersing treatment, diluted by adding 66.7 parts of ion-exchanged water, and then filtered similarly as in Example 1, to obtain an aqueous dispersion. Concentration of dye in this aqueous dispersion was 15%. Average particle size and viscosity thereof were 72 nm and 7.5 mPa·s, respectively.

TABLE 24

| | |
|---|---|
| Kayaset Blue$^{RTM}$ A-2R | 25.0 parts |
| LAVELIN$^{RTM}$ W-P | 25.0 parts |
| NIKKOL$^{RTM}$ BPS-30 | 1.5 parts |
| 10% SURFINOL$^{RTM}$ 104PG | 0.6 parts |
| Ion-exchanged water | 47.9 parts |

EXAMPLE 20

An ink composition for print of black color was prepared by using the following formulation similarly as in Example 2. Viscosity, average particle size and surface tension thereof were 3.2 mPa·s, 89 nm, and 30.7 mN/m, respectively. The resultant ink was printed on a PPC paper using a commercially available printer (made by Seiko Epson Corp., PM-740C), and jetting property was evaluated.

TABLE 25

| | |
|---|---|
| Dispersion of Example 17 | 61.5 parts |
| Dispersion of Example 18 | 53.5 parts |
| Dispersion of Example 19 | 172.2 parts |
| Glycerin | 50.0 parts |
| Propylene glycol | 25.0 parts |
| BYK-348 | 1.5 parts |
| Ion-exchanged water | 136.3 parts |

EXAMPLE 21

The following composition was subjected to dispersing treatment, diluted by adding 25 parts of ion-exchanged water, and then filtered similarly as in Example 1, to obtain an aqueous dispersion having average particle size, viscosity, and dye concentration of 58 nm, 4.5 mPa·s, and 20%, respectively.

TABLE 26

| | |
|---|---|
| C.I. Disperse Blue$^{RTM}$ 60 (Note 11) | 25.0 parts |
| LAVELIN$^{RTM}$ W | 15.2 parts |
| NIKKOL$^{RTM}$ BPS-30 | 2.0 parts |
| KS530 (Note 12) | 0.1 part |
| Ion-exchanged water | 57.7 parts |

(Note 11): made by Nippon Kayaku Co., Ltd.
(Note 12): product name, made by Shin-Etsu Chemical Co., Ltd., silicone type of antifoaming agent

EXAMPLE 22

An ink composition for printing was prepared by using the following formulation similarly as in Example 2, to obtain an cyan ink having viscosity, average particle size and surface tension of 2.8 mPa·s, 67 nm, and 29.0 mN/m, respectively. The resultant ink was printed on a pretreated PET cloth with an IJ printer, followed by dyeing and washing similarly as in Example 14, to obtain a dyed article of brilliant cyan color. Fastnesses of this dyed article were as follows;

light fastness (JIS L-0842, carbon)=Class 6, water fastness (JIS L-0846A)

Discoloration and fading=Class 4 to 5, and PET staining=Class 5, and these were sufficiently practicable levels for clothing use.

TABLE 27

| | |
|---|---|
| Dispersion of Example 21 | 250.0 parts |
| Glycerin | 130.0 parts |
| Propylene glycol | 90.0 parts |
| BYK-348 | 1.0 part |
| Proxel$^{RTM}$ GXL(S) (Note 13) | 0.5 parts |
| Ion-exchanged water | 528.5 parts |

(Note 13): made by Avecia Ltd., antiseptic agent.

EXAMPLE 23

The following composition was subjected to dispersing treatment, diluted by adding 50 parts of ion-exchanged water, and then filtered similarly as in Example 1, to obtain an aqueous dispersion having average particle size, viscosity, and dye concentration of 87 nm, 9.9 mPa·s, and 20%, respectively.

TABLE 28

| | |
|---|---|
| Kayaset Yellow$^{RTM}$ A-H (Note 14) | 30 parts |
| LAVELIN$^{RTM}$ W | 45 parts |
| NIKKOL$^{RTM}$ BPS-30 | 3 parts |
| KS530 | 0.1 part |
| Ion-exchanged water | 21.9 parts |

(Note 14): made by Nippon Kayaku Co., Ltd., C.I. Disperse Yellow 160.

EXAMPLE 24

An ink composition for printing was prepared by using the following formulation similarly as in Example 2, to obtain a yellow ink having viscosity, average particle size and surface tension of 2.9 mPa·s, 92 nm, and 33.0 mN/m, respectively. The resultant ink was printed on a pretreated PET cloth with an IJ printer, followed by dyeing and washing similarly as in Example 14, to obtain a dyed article of brilliant yellow color. Fastnesses of this dyed article were as follows;

light fastness (JIS L-0842, carbon)=Class 6 or higher, water fastness (JIS L-0846A)

Discoloration and fading=Class 5, and PET staining=Class 5, and these were sufficiently practicable levels for clothing use.

TABLE 29

| | |
|---|---|
| Dispersion of Example 23 | 250.0 parts |
| Glycerin | 130.0 parts |
| Propylene glycol | 90.0 parts |
| BYK-348 | 1.0 part |
| Proxel$^{RTM}$ GXL | 0.5 parts |
| Ion-exchanged water | 528.5 parts |

EXAMPLE 25

The following composition was subjected to dispersing treatment, diluted by adding 50 parts of ion-exchanged water, and then filtered similarly as in Example 1, to obtain about 100 parts of an aqueous dispersion having average particle size, viscosity, and dye concentration of 110 nm, 6.0 mPa·s, and 20%, respectively.

TABLE 30

| | |
|---|---|
| C.I. Disperse Blue$^{RTM}$ 281 (Note 15) | 30 parts |
| LAVELIN$^{RTM}$ W-P | 18 parts |
| NIKKOL$^{RTM}$ BPS-20 (Note 16) | 1.2 parts |
| KS530 | 0.1 part |
| Ion-exchanged water | 50.7 parts |

(Note 15): made by Nippon Kayaku Co., Ltd.
(Note 16): made by Nikko Chemicals Co., Ltd., EO (20) adduct of phytosterol.

EXAMPLE 26

The following composition was subjected to dispersing treatment, diluted by adding 50 parts of ion-exchanged water, and then filtered similarly as in Example 1, to obtain about 100 parts of an aqueous dispersion having average particle size, viscosity, and dye concentration of 150 nm, 5.0 mPa·s, and 20%, respectively.

TABLE 31

| | |
|---|---|
| C.I. Disperse Orange$^{RTM}$ 73 (Note 17) | 30 parts |
| LAVELIN$^{RTM}$ W | 30 parts |
| NIKKOL$^{RTM}$ BPS-20 | 1.2 parts |
| KS530 | 0.1 part |
| Ion-exchanged water | 38.7 parts |

(Note 17): made by Nippon Kayaku Co., Ltd.

EXAMPLE 27

The following composition was subjected to dispersing treatment, diluted by adding 50 parts of ion-exchanged water, and then filtered similarly as in Example 1, to obtain about 100 parts of an aqueous dispersion having average particle size, viscosity, and dye concentration of 139 nm, 4.0 mPa·s, and 20%, respectively.

TABLE 32

| | |
|---|---|
| C.I. Disperse Red$^{RTM}$ 152 (Note 18) | 30 parts |
| LAVELIN$^{RTM}$ W | 23 parts |
| NIKKOL$^{RTM}$ BPS-30 | 1.8 parts |
| KS530 | 0.1 part |
| Ion-exchanged water | 45.1 parts |

(Note 18): made by Nippon Kayaku Co., Ltd.

EXAMPLE 28

An ink composition for printing was prepared by using the following formulation similarly as in Example 2, to obtain an black ink having viscosity, average particle size and surface tension of 3.9 mPa·s, 118 nm, and 28.0 mN/m, respectively. The resultant ink was printed on a pretreated PET cloth with an IJ printer, followed by dyeing and washing similarly as in Example 14, to obtain a dyed article of black color. Fastnesses of this dyed article were as follows;

light fastness (JIS L-0842, carbon)=Class 4, water fastness (JIS L-0846A)

Discoloration and fading=Class 4 to 5, and PET staining==Class 5, and these were sufficiently practicable levels for clothing use.

TABLE 33

| | |
|---|---|
| Blue dispersion of Example 25 | 262.5 parts |
| Orange dispersion of Example 26 | 208.5 parts |
| Red dispersion of Example 27 | 29.0 parts |
| Glycerin | 100.0 parts |
| Propylene glycol | 50.0 parts |
| BYK-348 | 1.0 part |
| Ion-exchanged water | 349.0 parts |

TABLE 34

| | Particle size (nm) | Viscosity (mPa · s) | Settling | After 1 week at 60° C. Particle size (nm) | Viscosity (mPa · s) |
|---|---|---|---|---|---|
| Example 15 | 66 | 9.0 | ○ | 65 | 9.0 |
| Example 17 | 82 | 2.5 | ○ | 91 | 2.4 |
| Example 18 | 84 | 4.7 | ○ | 87 | 4.8 |
| Example 19 | 72 | 7.5 | ○ | 70 | 7.7 |
| Example 21 | 58 | 4.5 | ○ | 78 | 4.1 |
| Example 23 | 87 | 9.9 | ○ | 99 | 6.8 |

TABLE 35

| | Particle size (nm) | Viscosity (mPa · s) | Surface tension (mN/m) | Settling | After 1 week at 60° C. Particle size (nm) | Viscosity (mPa · s) | jetting property |
|---|---|---|---|---|---|---|---|
| Example 16 | 67 | 3.1 | 28.0 | ○ | 68 | 3.1 | ○ |
| Example 20 | 89 | 3.2 | 30.7 | ○ | 88 | 3.0 | ○ |
| Example 22 | 67 | 2.8 | 29.0 | ○ | 98 | 3.0 | ○ |
| Example 24 | 92 | 2.9 | 33.0 | ○ | 95 | 2.9 | ○ |
| Example 28 | 118 | 3.9 | 28.0 | ○ | 136 | 3.7 | Δ-○ |

What is claimed is:

1. An aqueous dispersion comprising 10 to 25% by mass of a water-insoluble coloring material, and 3 to 25% by mass of an anionic dispersing agent based on the whole aqueous dispersion, and 3 to 45% by mass of at least one kind of compounds selected from the group consisting of ethylene oxide adducts of phytosterols and ethylene oxide adducts of cholestanols based on the anionic dispersing agent, and the rest is water.

2. The aqueous dispersion according to claim 1, wherein at least one kind of compounds selected from the group consisting of ethylene oxide adducts of phytosterols and ethylene oxide adducts of cholestanols is 1 to 10% by mass.

3. The aqueous dispersion according to any one of claims 1 and 2, wherein the water-insoluble coloring material is at least one kind of dye selected from the group consisting of disperse dyes and oil-soluble dyes.

4. An ink composition comprising the aqueous dispersion according to any one of claims 1 and 2 and a water-soluble organic solvent.

5. The ink composition according to claim 4, comprising at least one kind of polysiloxane compound.

6. The ink composition according to claim 4, comprising 10 to 30% by mass of glycerin as the water-soluble organic solvent.

7. The ink composition according to claim 5, wherein surface tension thereof at 25° C. is in a range from 20 to 40 mN/m and viscosity thereof at 25° C. is in a range from 2 to 10 mPa·s.

8. A method for inkjet recording comprising jetting the ink composition according to claim 4.

9. A recorded article obtained by means of the method for inkjet recording according to claim 8.

10. A method for inkjet dyeing comprising fixing a coloring material to the hydrophobic fiber by means of steaming or baking treatment after providing the ink composition according to claim 4 to a hydrophobic fiber by means of an inkjetting.

11. A dyed article obtained by means of the method for inkjet dyeing according to claim 10.

12. A method for inkjet coloring comprising performing an inkjet recording with the ink composition according to claim 4 on an intermediate recording medium to obtain a recorded image and then by transferring said recorded image from the intermediate recording medium to a hydrophobic material by means of heat treatment.

13. A colored article obtained by means of the method for inkjet coloring according to claim 12.

14. An aqueous dispersion comprising 3 to 35% by mass of a water-insoluble coloring material, 1 to 35% of an anionic dispersing agent, 0.1 to 15% by mass of at least one kind of compounds selected from the group consisting of alkylene oxide adducts of phytosterols and alkylene oxide adducts of cholestanols, and the rest is water, based on the whole aqueous dispersion.

15. The aqueous dispersion according to claim 14 further comprising a water-soluble organic solvent.

16. An ink composition comprising a water-insoluble coloring material, water, an anionic dispersing agent, at least one kind of compounds selected from the group consisting of alkylene oxide adducts of phytosterols and alkylene oxide adducts of cholestanols, and a water-soluble organic solvent.

17. The ink composition according to claim 16, wherein the alkylene oxide adducts is an ethylene oxide adduct.

18. A method for producing an ink composition comprising mixing an aqueous dispersion comprising a water-insoluble coloring material, water, an anionic dispersing agent, and at least one kind of compounds selected from the group consisting of alkylene oxide adducts of phytosterols and alkylene oxide adducts of cholestanols, with a water-soluble organic solvent.

* * * * *